UNITED STATES PATENT OFFICE.

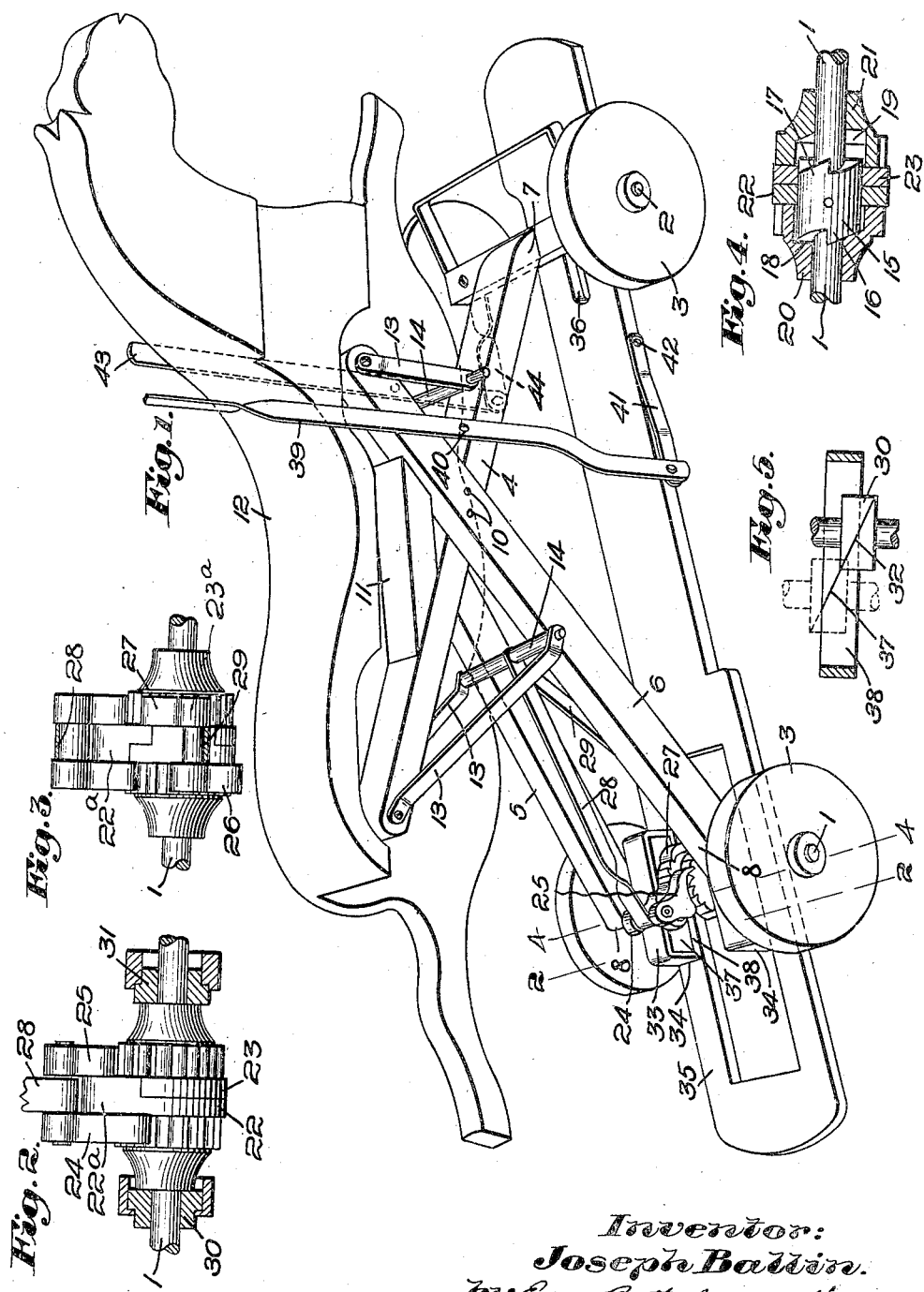

JOSEPH BALLIN, OF DUBUQUE, IOWA.

HOBBYHORSE.

1,376,132.  Specification of Letters Patent.  Patented Apr. 26, 1921.

Application filed February 5, 1920. Serial No. 356,386.

*To all whom it may concern:*

Be it known that I, JOSEPH BALLIN, a citizen of the United States, and resident of Dubuque, county of Dubuque, State of Iowa, have invented an Improvement in Hobby-horses, of which the following description, in connection with the accompanying drawings, is a specification, like characters on the drawings representing like parts.

This invention relates to vehicles adapted to be propelled by the rider and particularly to that type of vehicle known as the hobby horse. Its aim is to provide an improved vehicle of that class capable of being reversed and steered at will, and similar to the construction illustrated in Patent No. 517,142, dated March 27, 1894.

In the drawings,

Figure 1 is a partial sectional perspective of one embodiment of my invention;

Fig. 2, a rear elevation and partial section on line 2—2 Fig. 1, of the rear driving ratchet operating members and axle boxes;

Fig. 3, a similar front elevation of the rear and front ratchet operating members;

Fig. 4, a vertical section from the left on line 4—4 Fig. 1, the axle ends being broken out for convenience; and Fig. 5, a plan, and partial sectional view of one of the axle boxes and reversing guides therefor.

My novel hobby horse, as illustrated, comprises rear and forward axles 1, 2, respectively, provided with wheels or rollers 3, of any desired type. The seat, herein horse, supporting frame comprises a forward member 4 and two rear diverging members 5, 6, the forward end 7 of the member 4 being pivotally secured to the axle 2, and the rear ends 8 of the members 5, 6, secured to the axle 1. The frame members are secured together at their meeting point by any suitable means as pins 10. A brace 11 may be used for the frame members 4, 5, 6, if desired.

The horse 12, Fig. 1, which, in this case, as stated, furnishes the seat for the rider and operator, is suspended from the frame by links 13 depending from the frame members 4, 5, 6, and pivoted at their lower ends to bars 14 extended through the body of the horse.

Obviously the horse so mounted, is capable of a forward and backward rocking motion by the efforts of the rider, and the rocking motion is imparted to the driving means in the following manner.

The propelling or driving means comprises, Fig. 4, a double ratchet member 15 keyed to the driving axle 1, having the ratchet teeth 16, 17 at the two opposite ends, facing and driving in opposite directions, and engaging interior coöperating teeth 18, 19 on the inner ends of the loose ratchet members 20, 21 respectively on the shaft 1.

While capable of independent rotary motion these ratchet members 20, 21, are so spaced, Figs. 2, 3, 4, that only one of them can engage the fixed ratchet 15 at any one time. This is effected Fig. 4, by the use of the pawl bearing collars 22, 23, loose upon the ratchet 15, and Fig. 2, carrying rear pawls 24, 25, and Fig. 3, front pawls 26, 27, the two pawls of each set on the arms 22$^a$ and 23$^a$ respectively operating in opposite directions on the respective ratchets.

These pawls Figs. 2, 3, are actuated by links 28, 29, respectively connecting them to the bar 14 on the frame and by which they are actuated. The two sets of pawls are so spaced circumferentially Figs. 1, 2, 3, that the two pawls 25, 26 are driving, the first forward, and the second backward, when the links 28, 29, are moving upward, and the pawls 24, 27, driving, the first backward, and the second forward, when the links 28, 29, are moving downward, during the rocking motion of the horse.

Inasmuch as the ratchets 20, 21, cannot both engage the ratchet 15 at the same time, it follows that one of the ratchets 20, 21, will be idling while the other is working.

To control the operation of these ratchets and propel the horse forward or backward, as may be desired, I employ the following construction. On the shaft 1, Figs. 2, 5, are two blocks 30, 31, having each, a diagonal shoulder or cam face 32 on its upper face, engaging a similar and coöperating shoulder, not shown, on the under side of the upper guide 33 of the cam guide 34 on a rack 35 extended the length of the vehicle, a slot 36 in the forward end receiving a pin, not shown, extended downwardly from the axle 2. The lower faces of the blocks 30, 31 have like cam faces engaging like coöperating faces 37 on the lower guide 38.

When the rack 35 is pushed forward, the guides 33, 38, are carried forward and the shoulder or cam faces referred to being pushed laterally to the left, Fig. 1, slide the loose ratchets 20, 21, and their pawl collars, arms and pawls to the left, Figs. 1, 5, on the shaft 1, and the ratchet 20 engages, Fig. 4, the left hand end of ratchet 15 and thus the vehicle is propelled forward. When the rack 35 is in its rearward position the action of the cams referred to is reversed and throws the ratchets 20, 21, to the right on axle 1, Figs. 1, 5, and the ratchet 21, when driven forward by the pawl 24, will turn the axle 1 and propel the horse rearward or backward.

For throwing the rack 35 forward or backward at will a lever 39 is provided pivoted to the horse at 40, and pivotally connected at its lower end with the link 41, the opposite end of which is loosely connected with the rack 35 at 42.

Of course if when the horse is traveling either forward or backward, the rack 35 strikes an obstruction before the reversing lever is thrown, such impact will automatically reverse the direction of travel of the horse.

A lever 43 is similarly pivoted to the opposite side of the horse and connected by a link 44 with the front axle 2, and by means of which the vehicle may be steered and guided at will by the rider.

While I have described one embodiment of my invention, it is obvious that the invention is not limited to the precise embodiment illustrated and described herein, and I claim:

1. A vehicle having a seat, a frame therefor, rollers or wheels for the frame, connections between the seat and wheels whereby rocking of the seat will drive the vehicle, and means including a rack in engagement with the connections, and a lever pivoted to the seat and rack for reversing from the seat, the direction of travel, at will.

2. A vehicle having a seat, a frame therefor, rollers or wheels for the frame, connections between the seat and wheels whereby rocking of the seat will drive the vehicle, and means including a rack supported by the front axle in engagement with the connections and a lever pivoted to the seat and rack for reversing from the seat, the direction of travel, at will, and means also connected to the front axle for steering the vehicle from the seat.

3. A vehicle having a seat, a frame therefor, rollers or wheels for the frame, connections between the seat and wheels whereby rocking of the seat will drive the vehicle, and means including a rack supported by the front axle in engagement with the connections, and a lever pivoted to the seat and rack for reversing from the seat, the direction of travel at will, means also connected to the front axle for steering the vehicle from the seat, and means including the rack serving automatically to reverse the direction of motion if the vehicle comes in contact with an obstruction.

4. A vehicle comprising a seat 12, a frame therefor comprising bars 4, 5, 6, pivoted connections 13 and 14 for the seat and frame, rollers 3 for the vehicle, on axles 1 and 2, a rack 35 slidably connected with the axles 1 and 2, gear connections between the frame members 5, 6, and the axle 1, blocks 30, 31, having cam faces 32 engaging similar coöperating faces on guides 33 adapted to be adjusted by movement of the rack 35 for reversing the direction of travel of the vehicle, and a lever 39 pivoted to the seat and the rack for adjusting the latter.

5. A vehicle having a seat, a frame therefor, rollers or wheels for the frame, connections between the seat and wheels whereby rocking of the seat will drive the vehicle, and means including a movable rack in engagement with the connections, and rack controlling means, and vehicle steering means operable from the seat for controlling movement of the vehicle.

In testimony whereof I have signed my name to this specification.

JOSEPH BALLIN.